(12) United States Patent
Coronado et al.

(10) Patent No.: US 9,187,887 B2
(45) Date of Patent: Nov. 17, 2015

(54) FLANGE SYSTEM WITH MODULAR SPACERS

(75) Inventors: Eduardo Coronado, San Pedro Garza Garcia (MX); Jorge Sada, San Pedro Garza Garcia (MX)

(73) Assignee: Coflex S.A. de C.V. (MX)

( * ) Notice: Subject to any disclaimer, the term of this patent is extended or adjusted under 35 U.S.C. 154(b) by 1241 days.

(21) Appl. No.: 13/078,458

(22) Filed: Apr. 1, 2011

(65) Prior Publication Data

US 2012/0079648 A1 Apr. 5, 2012

Related U.S. Application Data

(60) Continuation-in-part of application No. 12/906,947, filed on Oct. 18, 2010, now Pat. No. 8,365,318, which is a division of application No. 11/212,091, filed on Aug. 25, 2005, now Pat. No. 7,814,580, which is a continuation-in-part of application No. 10/370,747, filed on Feb. 20, 2003, now abandoned.

(51) Int. Cl.
*E03D 11/16* (2006.01)
*F16L 47/06* (2006.01)
(Continued)

(52) U.S. Cl.
CPC ............. *E03D 11/16* (2013.01); *F16L 47/06* (2013.01); *F16L 47/14* (2013.01); *F16L 47/18* (2013.01); *F16L 47/32* (2013.01); *E03D 11/17* (2013.01); *Y10T 29/49826* (2015.01)

(58) Field of Classification Search
CPC ............ E03D 11/16; E03D 11/17; E03C 1/12
USPC ..................................... 4/252.1, 252.4–252.6
See application file for complete search history.

(56) References Cited

U.S. PATENT DOCUMENTS 961,685 A 6/1910 Cosgrove
2,976,543 A 3/1961 Turner et al.
(Continued)

OTHER PUBLICATIONS

Wax-Free Bowl Gasket (7500, 7503, 7504)—Printed Aug. 25, 2005 www.fluidmaster.com/connect_products_7500.html.
(Continued)

*Primary Examiner* — Huyen Le
(74) *Attorney, Agent, or Firm* — Baker & McKenzie LLP

(57) ABSTRACT

The present disclosure generally relates to improved water closet flanges and methods for installing such water closet flanges. In one exemplary embodiment, an improved water close flange apparatus includes a modular spacer system for raising an upper surface of the outer surface above a finish flooring surface installed on top of a ground slab in order to improve the ease of installation. In one embodiment, an improved water closet flange apparatus includes an outer flange and a flexible conduit portion (i.e. sleeve) extending downwardly therefrom. The flexible sleeve has a sufficient degree of flexibility to accommodate connection between offset, misaligned, angled, or otherwise incongruous plumbing fixture discharges and waste drain pipe outlets. In one embodiment, the flexible sleeve includes at least one corrugated portion to aid the desired flexibility. An upper portion of the flexible sleeve may include an inwardly extending lip portion to accommodate the desired seal between the plumbing fixture discharge and the flange apparatus. Related methods for installing the disclosed flange apparatus between plumbing fixture discharges and waste drainpipes are also described. Embodiments of flange systems with modular spacers are also disclosed.

29 Claims, 16 Drawing Sheets

(51) Int. Cl.
*F16L 47/14* (2006.01)
*F16L 47/18* (2006.01)
*F16L 47/32* (2006.01)
*E03D 11/17* (2006.01)

(56) References Cited

U.S. PATENT DOCUMENTS

| | | | |
|---|---|---|---|
| 3,730,228 A | 5/1973 | Gibbs | |
| 3,821,820 A | 7/1974 | Thompson | |
| 3,860,978 A | 1/1975 | Wirth | |
| 3,873,137 A | 3/1975 | Yamaguchi | |
| 3,896,510 A * | 7/1975 | O'Connell | 4/252.1 |
| 3,967,324 A | 7/1976 | Olive | |
| 3,967,836 A | 7/1976 | Izzi, Sr. | |
| 3,970,334 A | 7/1976 | Campbell | |
| 4,151,864 A | 5/1979 | Thurman | |
| 4,318,519 A | 3/1982 | Blevins | |
| 4,508,370 A | 4/1985 | Schroeder | |
| 4,799,713 A | 1/1989 | Uglow | |
| 5,018,224 A | 5/1991 | Hodges | |
| 5,063,616 A | 11/1991 | Bresnahan | |
| 5,143,122 A | 9/1992 | Adkins | |
| 5,291,619 A | 3/1994 | Adorjan | |
| 5,297,817 A | 3/1994 | Hodges | |
| 5,819,326 A | 10/1998 | Kobayashi et al. | |
| 5,996,134 A * | 12/1999 | Senninger | 4/252.4 |
| 6,052,839 A | 4/2000 | Teskey | |
| 6,152,186 A | 11/2000 | Arney et al. | |
| 6,327,717 B1 | 12/2001 | Johnson et al. | |
| 6,332,632 B1 | 12/2001 | Hodges | |
| 6,435,563 B2 | 8/2002 | Phillips | |
| 6,443,495 B1 | 9/2002 | Harmeling | |
| 6,519,784 B2 | 2/2003 | Carwile | |
| 6,581,214 B1 * | 6/2003 | Love et al. | 4/252.2 |
| 6,719,294 B2 | 4/2004 | Nguyen | |
| 7,188,376 B2 | 3/2007 | Ortiz et al. | |
| 2002/0023294 A1 | 2/2002 | Spells, Sr. | |
| 2006/0213003 A1 | 9/2006 | Hughes | |
| 2009/0119826 A1 | 5/2009 | Coronado | |
| 2010/0037376 A1 | 2/2010 | Hughes | |

OTHER PUBLICATIONS

FluidMaster 7500 Wax-Free Toilet Bowl Gasket Kit Installation Instructions—Printed Aug. 25, 2005 www.fluidmaster.com/connect_products_7500.html.
PCT/IB2012/000803, International Search Report and Written Opinion of the International Searching Authority mailed Oct. 16, 2012.
PCT/IB06/02218, PCT International Search Report and Written Opinion of International Searching Authority dated May 7, 2007.
PCT/IB04/00594—PCT International Search Report and Written Opinion of the International Searching Authority mailed Mar. 8, 2005.

* cited by examiner

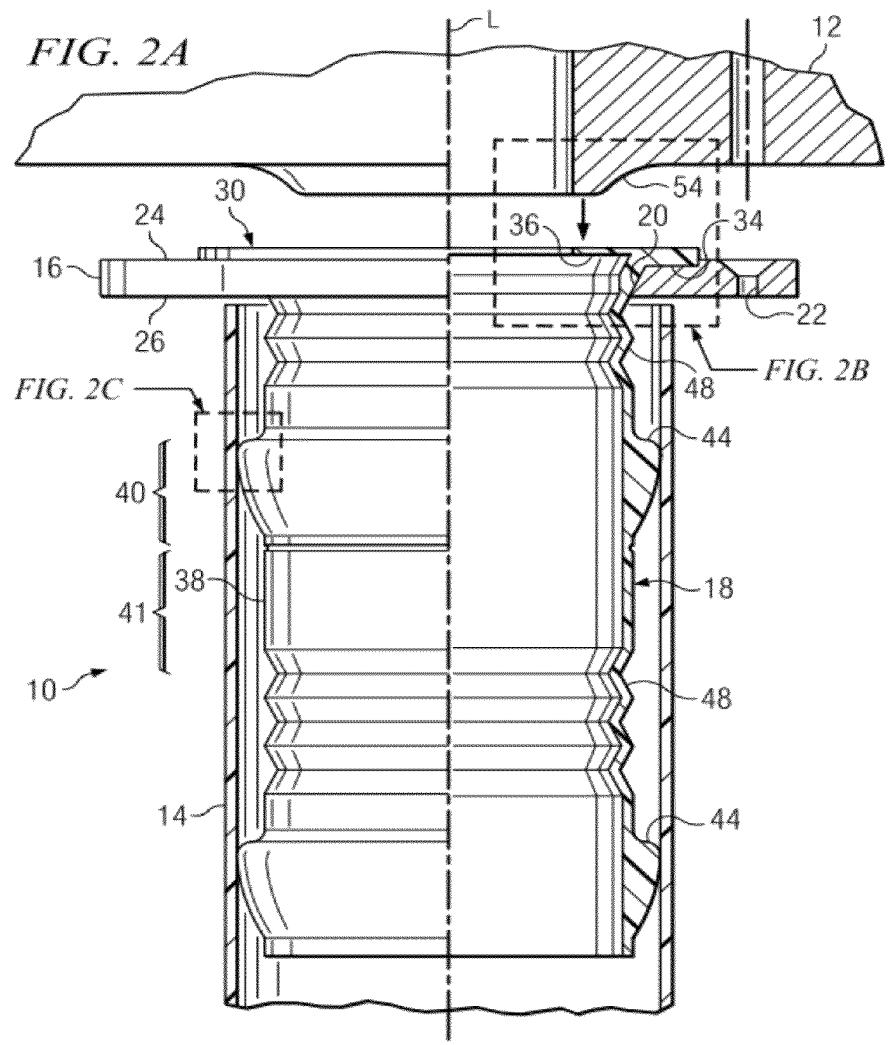
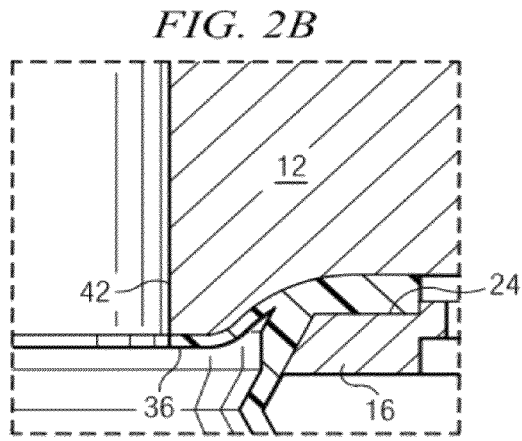
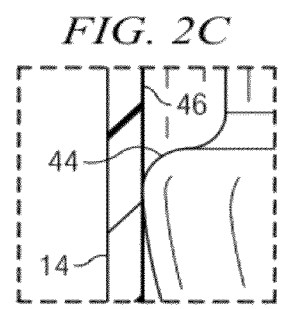

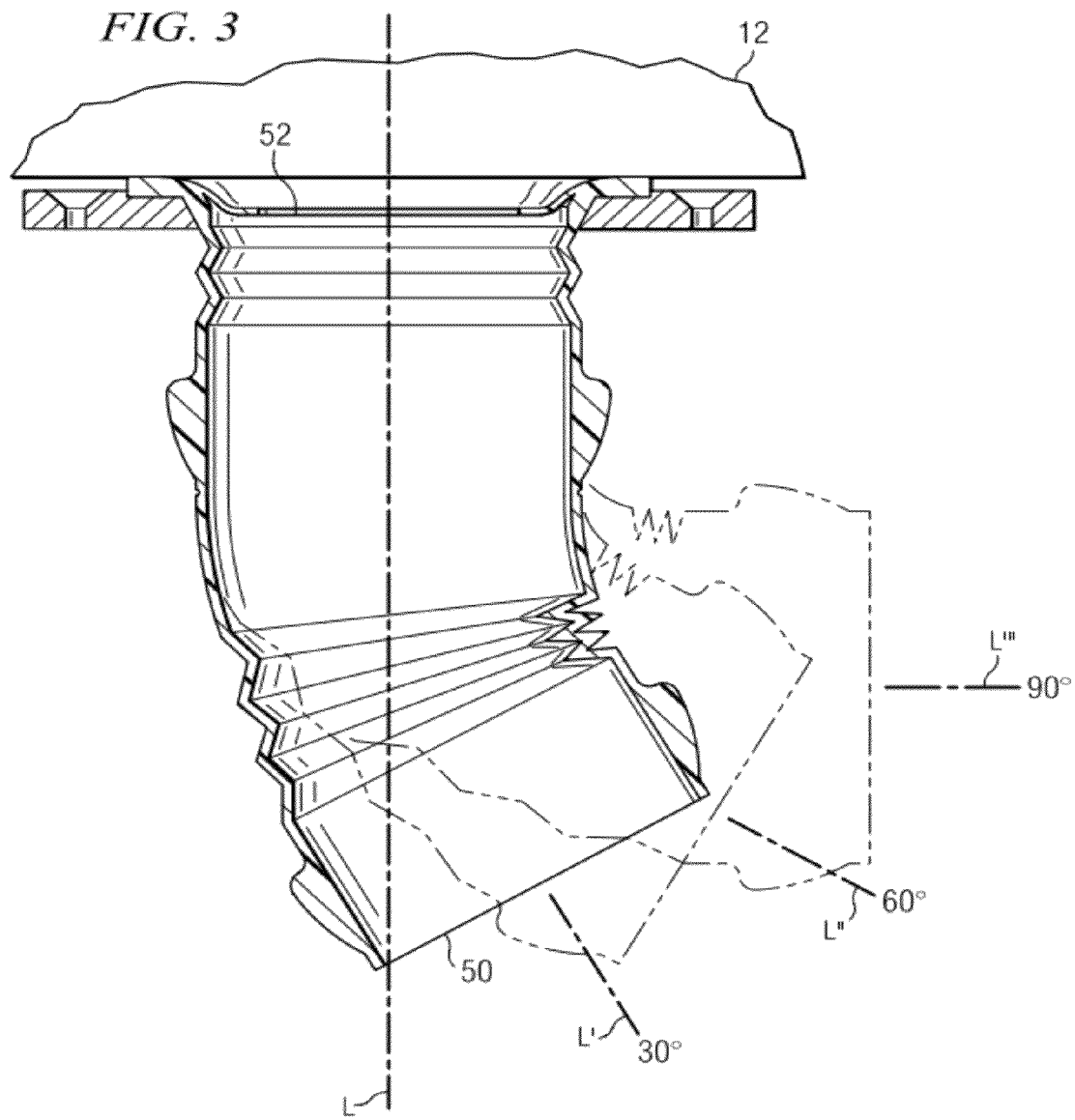

FLANGE SYSTEM WITH MODULAR SPACERS

CROSS-REFERENCE TO RELATED APPLICATIONS

The present application is a continuation-in-part of the co-pending U.S. patent application Ser. No. 12/906,947 filed on Oct. 18, 2010, which is a continuation application of U.S. patent application Ser. No. 11/212,091 filed on Aug. 25, 2005, now U.S. Pat. No. 7,814,580, issued Oct. 19, 2010, entitled "Flexible Flange Apparatus For Connecting Conduits and Methods for Connecting the Same," which is a continuation-in-part of U.S. patent application Ser. No. 10/370,747, filed Feb. 20, 2003, entitled "Improved Flexible Sleeve for Connection to a Plumbing Fixture," all of which are incorporated herein by reference in their entirety.

TECHNICAL FIELD

The present disclosure relates generally to devices for connecting conduits, such as plumbing fixtures to waste drain conduits, and more particularly to a flange apparatus, including a specially configured flexible sleeve and a closet flange, which mounts a water closet (toilet) on a supporting floor surface and also provides a sealed interconnection between a water closet (toilet) and a water waste drain pipe. Related methods for interconnecting conduits are also described.

BACKGROUND

Water closets, also called toilets, are waste disposal devices commonly installed in most bathrooms. These kinds of plumbing appliances generally include a water-storing receptacle called a water tank that is attached to a siphon seat-shaped bowl called a toilet bowl. Periodically, waste is removed from the toilet bowl by flushing, thereby allowing water to drain from the water tank through the toilet bowl and into a waste drainpipe. In order to work, however, the toilet bowl must be connected to the waste drainpipe by fluid carrying conduits. Typically, the toilet bowl will sit flat on a floor and connect with a rigid water closet flange. The water closet flange in turn connects with conduits leading to a waste drainpipe.

Conventional water closet flanges are typically designed to interconnect between conduits lying on a common longitudinal axis. Accordingly, such water closet flanges are formed to be rigid and generally do not provide any kind of flexibility along their conduit portion and are therefore insufficient for allowing any non-negligible distortion of the flange.

Moreover, flexible flanges may be desirable when connecting between discharge pipes and waste drain outlets having offset, misaligned, angled, or otherwise incongruous configurations.

As can be appreciated, the aforementioned problems are attributable to varying construction methods and materials. Most professionals who deal with these kinds of problems turn to the use of wax seals and/or modification of the waste drainpipe. However, these solutions are not reliable because the seal connection is not strong enough to prevent leakage and associated odors, and oftentimes they can be expensive and inefficient due to delays in the installation process.

Also, conventional closet flanges are made for a specific type of piping, such as cast iron piping, PVC piping, or ABS piping, but not compatible with multiple types of pipings. One reason is due to metal piping having a smaller internal diameter than the ones made from PVC or ABS.

Improved water closet flanges for addressing the above-described problems are desired. Related methods for installing improved water closet flanges are also desired.

BRIEF SUMMARY

The present disclosure generally relates to improved water closet flanges and methods for installing such water closet flanges. In an exemplary embodiment, an improved water closet flange apparatus includes an outer flange and a plurality of modular spacers operable to raise an upper surface of the outer flange so that the upper surface is disposed above a finish flooring surface located on top of a ground slab. The modular spacers have a plurality of projections extending from their upper surface to be received into recessed areas defined in the lower surface of the outer flange. Furthermore, the modular spacers are stackable. In one embodiment, the apparatus also includes a flexible conduit portion (i.e. sleeve) extending downwardly from the outer flange. The flexible sleeve has a sufficient degree of flexibility to accommodate connection between offset, misaligned, angled, or otherwise incongruous plumbing fixture discharges and waste drainpipe outlets. In one embodiment, the flexible sleeve includes at least one corrugated portion to aid the desired flexibility while preventing kinking of the flexible sleeve. An upper portion of the flexible sleeve may include an inwardly extending lip portion to accommodate the desired seal between the plumbing fixture discharge and the flange apparatus, thereby eliminating the need for a separate gasket element, such as a wax seal or rubber foam seal. Also, the improved water closet flange connects plumbing fixture discharges and waste drainpipes without any flow reduction between such elements.

Related methods for installing the disclosed flange apparatus between plumbing fixture discharges and waste drainpipes are also described.

Disclosed herein also includes an exemplary embodiment of an adjustable flange system for providing a conduit between a plumbing fixture discharge and waste drainpipe outlet. The system may comprise an outer flange having a recessed area defined in a lower surface of the outer flange, a flexible sleeve operable to be connected to an upper surface of the outer flange, and a modular spacer having a projection extending from an upper surface of the modular spacer, the projection operable to be received in the recessed area of the outer flange, thereby coupling the modular spacer to the outer flange.

Further disclosed herein is another embodiment of an adjustable flange system for providing a conduit between a plumbing fixture discharge and waste drainpipe outlet. The disclosed system may comprise an outer flange having a plurality of recessed areas defined in a lower surface of the outer flange, a flexible sleeve operable to be connected to an upper surface of the outer flange, and a plurality of modular spacers, each having an upper surface and a projection extending therefrom, the projection operable to be received in one of the recessed areas of the outer flange, thereby coupling each modular spacer to the outer flange.

Additionally, exemplary methods of manufacturing a flange system are also included herein. In an embodiment, the method of manufacturing a flange system may comprise forming an outer flange having a recessed area defined in a lower surface of the outer flange, forming a flexible sleeve operable to be connected to an upper surface of the outer flange, and forming at least one modular spacer having a projection extending from an upper surface of the modular spacer, the projection operable to be received in the recessed area of the outer flange, thereby coupling the modular spacer to the outer flange.

BRIEF DESCRIPTION OF THE DRAWINGS

Reference is now made to the following descriptions taken in conjunction with the accompanying drawings.

FIG. 2A illustrates a partial sectional, partial elevational view of the flange apparatus of FIG. 1 in its operative position between an exemplary plumbing discharge outlet and an exemplary waste drainpipe;

FIG. 2B illustrates a detailed sectional view of the plumbing fixture discharge seated against the flexible flange apparatus;

FIG. 2C illustrates a detailed elevational view of a sealing apparatus of the flexible flange apparatus disposed against the waste drainpipe;

FIG. 3 illustrates an elevational sectional view of exemplary distortion angles of the flange apparatus of FIG. 1;

DETAILED DESCRIPTION

Various aspects of a flexible flange apparatus and related methods for installing a flexible flange apparatus according to the present disclosure are described. It is to be understood, however, that the following explanation is merely exemplary in describing the devices and methods of the present disclosure. Accordingly, several modifications, changes and substitutions are contemplated.

Figure 1:
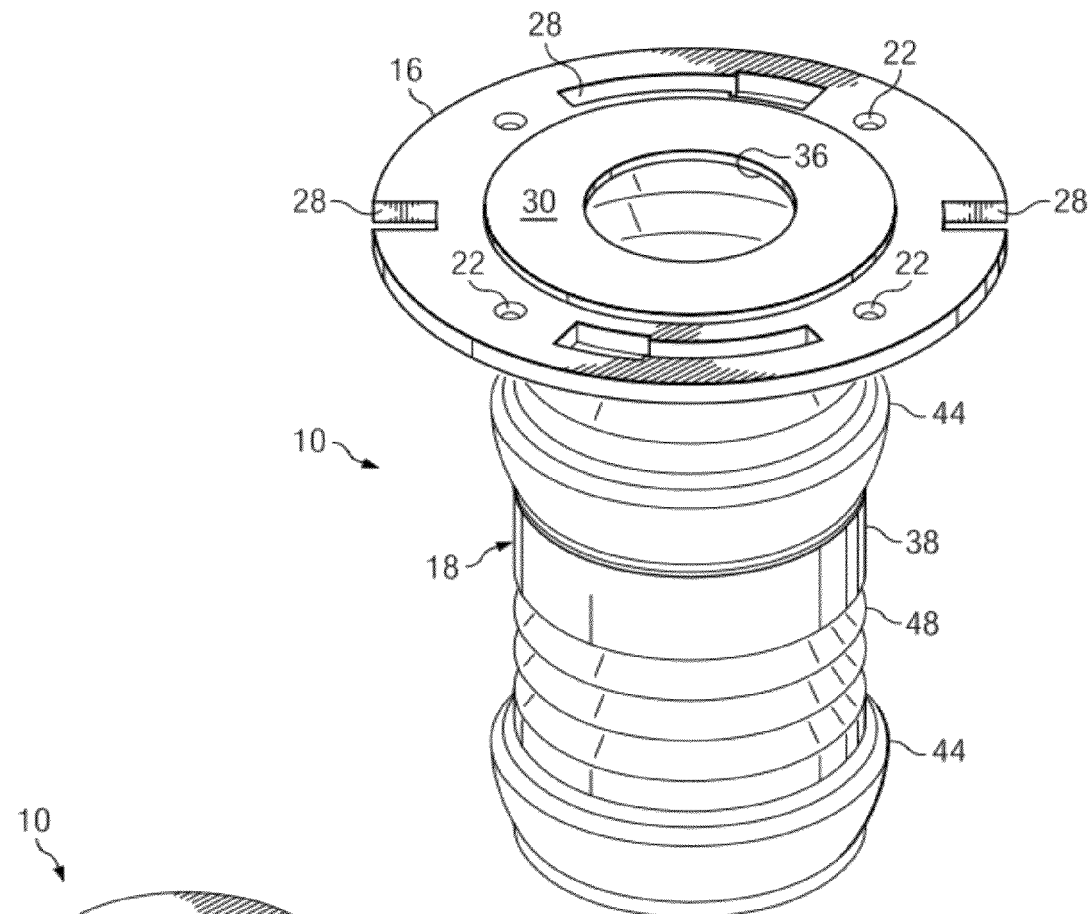
FIG. 1 illustrates an isometric view of one embodiment of a flexible flange apparatus according to the present disclosure.

FIGS. 1 and 2A illustrate a flexible flange apparatus 10 for connecting between a plumbing fixture discharge 12 and a waste drainpipe outlet 14. The flange apparatus includes an outer flange 16 and a sleeve 18 disposed through an aperture 20 of the outer flange. In some embodiments, the sleeve 18 is integrally formed with the outer flange 16 as a single piece, while in other embodiments, the sleeve is removably seated on the outer flange. The outer flange 16 may include one or more apertures 22 formed through the outer flange from an upper surface 24 to a lower surface 26 of the outer flange. The apertures 22 may receive fasteners (not shown) for securing the flange apparatus 10 to a surface, such as a floor disposed between a plumbing fixture discharge and a waste drainpipe outlet. The outer flange 16 may include additional apertures 28 formed therethrough for facilitating connection of the outer flange to a plumbing fixture discharge. The apertures 28 may take any suitable shape and size to accommodate varying plumbing fixture discharges.

The sleeve 18 includes an upper portion 30, which is seated in a radial groove 34 defined in the upper surface 24 of the outer flange 16. In some embodiments, the outer flange 16 includes a uniform upper surface 24 with no radial grooves and the upper portion 30 of the sleeve is seated on the substantially planar upper surface 24 of the outer flange. The upper portion 30 of the sleeve 18 includes an inwardly-extending radial lip 36, which is sufficiently flexible to deflect downwardly relative to the upper surface 24 of the outer flange 16 for reasons to be described.

The sleeve 18 further includes a lower portion 38 generally defined as the portion of the sleeve extending below the upper surface 24 of the outer flange 16. In one embodiment, the sleeve 18 is made of substantially uniform material, and thus, the lower portion 38 is sufficiently flexible to permit distortion of the lower portion to achieve non-negligible angles of deflection relative to a non-distorted longitudinal axis thereof. In one example, a non-negligible angle of deflection may be ten degrees or more of deflection of one end of the sleeve 18 relative to an opposing end of the sleeve. The sleeve 18 may be formed of various materials to permit non-negligible flexibility. For example, the sleeve 18 may be formed of materials having a hardness ranging from 35 shore A to 90 shore A, or from 35 shore A to 65 shore A, or more specifically about 50 shore A. As can be appreciated, the uniform nature of the sleeve 18 leads to a reduction in manufacturing costs and the likelihood of error during installation. Also, the sleeve 18 may be of any suitable length. In one example, the sleeve 18 is 7-8 inches in length.

The sleeve 18 further includes one or more sealing elements 44 extending annularly about the sleeve. In some embodiments, the sealing elements 44 form a portion of the sleeve 18, and therefore, constitute a region of increased diameter relative to other regions of the sleeve. For example, referring to FIG. 2A, the sealing element 44 generally corresponds to region 40, which is larger in diameter relative to region 41 of the sleeve 18. As illustrated, the sealing element 44 has a maximum diameter at its upper longitudinal end and generally decreases in diameter to its lower longitudinal end adjacent to the beginning of region 41. In this manner, the sealing element 44 provides a tight water seal with a larger longitudinal coverage than other sealing structures. It is contemplated that the sealing elements 44 may take other shapes so long as they seal the interface between the sleeve 18 and a waste drainpipe. For example, the sealing elements 44 may be modified to have a substantially uniform diameter, an increasing diameter from the lower longitudinal end to the upper longitudinal end of the sealing elements, or a varying diameter between longitudinal ends of the sealing elements.

Referring to FIG. 2A, the flange apparatus 10 is shown disposed between the plumbing fixture discharge 12 and the waste drainpipe 14 lying on a common longitudinal axis L. For purposes of this specification, a plumbing fixture discharge and a waste drainpipe lying on a common longitudinal axis are defined to be congruous. Accordingly, a plumbing fixture discharge and a waste drainpipe not lying on a common longitudinal axis are defined to be incongruous. The plumbing fixture discharge 12 may be seated against the sleeve 18 such that an extended portion 42 of the plumbing discharge comes into contact with inwardly-extending lip 36, thereby deflecting the lip downwardly relative to the upper surface 24 of the outer flange 16.

As shown in FIG. 2B, the inward lip 36 may deflect downwardly beyond the upper surface 24 of the outer flange 16 when in contact with the plumbing discharge 12. The lip 36 provides a tight seal that will prevent gas and fluids from leaking from the interconnection between the plumbing discharge 12 and the drainpipe 14 and the seal is sufficient to not break even if the toilet becomes backed up. Moreover, the sealing protection provided by the lip 36 eliminates the need for separate additional elements, such as regular wax seals or foam rubber gaskets.

Referring to FIG. 2C, one of the sealing elements 44 of the sleeve 18 is shown disposed against an inner wall 46 of the waste drainpipe 14. As discussed above, the sealing element 44 provides a tight seal between the sleeve 18 and the drainpipe 14, thereby preventing fluid and gases from traveling back up the sides of the sleeve when installed.

Referring again to FIG. 2A, the lower portion 38 may include one or more corrugated portions 48, which aid flexibility of the sleeve 18 while preventing kinking during flexing. As can be appreciated, the corrugated portions 48 along with the inherent flexibility of the sleeve 18 itself provides an increased degree of flexibility relative to conventional pipes that are designed for discharge pipes and waste drainpipes lying on a common longitudinal axis. Indeed, the flexible sleeve 18 with corrugated portions 48 facilitates distortion of the sleeve to achieve varying degrees of deflection of the sleeve relative to a longitudinal axis L of the sleeve when in a non-distorted position. For example, referring to FIG. 3, the flexible sleeve 18 with corrugated portions 48 may be distorted to achieve 30 degrees, 60 degrees and 90 degrees of deflection defined by the angular displacement of longitudinal axes L', L'' and L''', respectively, relative to the non-distorted longitudinal axis L. In this example, the longitudinal axes L', L'' and L''' refer to the longitudinal axis of a distal end 50 of the sleeve, whereas the longitudinal axis L is the axis of a proximal end 52 of the flexible sleeve. Moreover, the illustration of 30, 60 and 90 degrees merely exemplifies various deflection angles and it is to be understood that the sleeve 18 may be distorted to achieve any angle of deflection between 0 and 90 degrees. Still further, the resultant deflection angle between the ends 50, 52 of the sleeve 18 may be 0 degrees, yet the sleeve may be distorted along a midsection to accommodate installation between offset plumbing discharges and drainpipes.

In some embodiments, the entire sleeve 18 (including the upper 30 and lower 38 portions) may be formed of material having a greater degree of hardness relative to the previously described embodiments. For example, the hardness of the sleeve 18 may range up to a relatively rigid 120 Rockwell R. In embodiments where the sleeve 18 is formed of relatively rigid materials, the sleeve 18 may include any number of corrugated portions 48 to impart the desired flexibility to the sleeve. In these embodiments, an additional soft sealing element, such as an O-ring, may be added around the lower portion 38 and a wax seal or soft plastic material may be added adjacent to the lip 36. In still other embodiments, the upper portion 30 of the sleeve 18 may be formed of a flexible material while the lower portion 38 is formed of a relatively rigid material. In this example, the lower portion 38 maintains flexibility via the corrugated portions 48.

Figure 4:
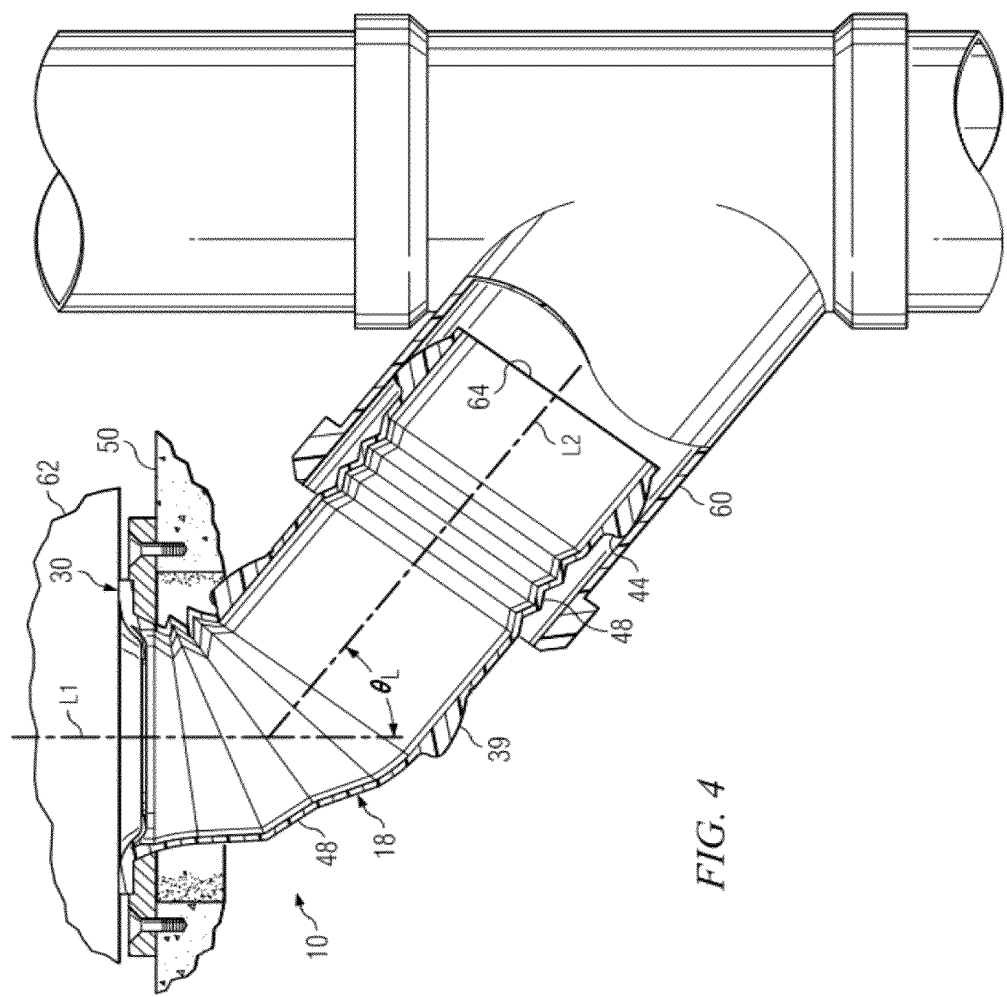
FIG. 4 illustrates an elevational sectional view of the flange apparatus installed in a diagonally oriented waste drainpipe.

In practice, the flange apparatus 10 is used to connect a plumbing fixture discharge, such as the distal portion of a toilet, to a waste drainpipe, such as a sewage line. In facilitating this connection, the flange apparatus 10 provides a tight seal and reliable connection to prevent any undue leakage or other undesirable consequence of the connection. During installation, the flange apparatus 10 may be seated against a surface disposed between a plumbing fixture discharge and a waste drainpipe, such as a floor surface. The sleeve 18 is flexible enough to permit installation between offset, misaligned, angled, or otherwise incongruous plumbing fixture discharges and waste drainpipe outlets. Referring to FIG. 4, the outer flange 16 is seated against a floor surface 50 and the sleeve 18 is shown installed in a waste drainpipe 60 oriented diagonally relative to the upper portion 30 of the sleeve and a plumbing discharge 62. In particular, the plumbing discharge 62 and the upper portion 30 of the sleeve 18 lie on a common longitudinal axis L1, whereas the waste drainpipe 60 and a lower end 64 of the sleeve 18 lie on a common longitudinal axis L2. The angular displacement between the longitudinal axes L1 and L2 is defined by $\theta_L$. The corrugated portion or portions 48 of the sleeve 18 facilitates distortion of the sleeve to achieve the desired angular displacement or deflection. Indeed, the installer may manually achieve the desired deflection (e.g., by bending the sleeve), thereby eliminating the need for additional equipment or materials for installation.

Figure 5:
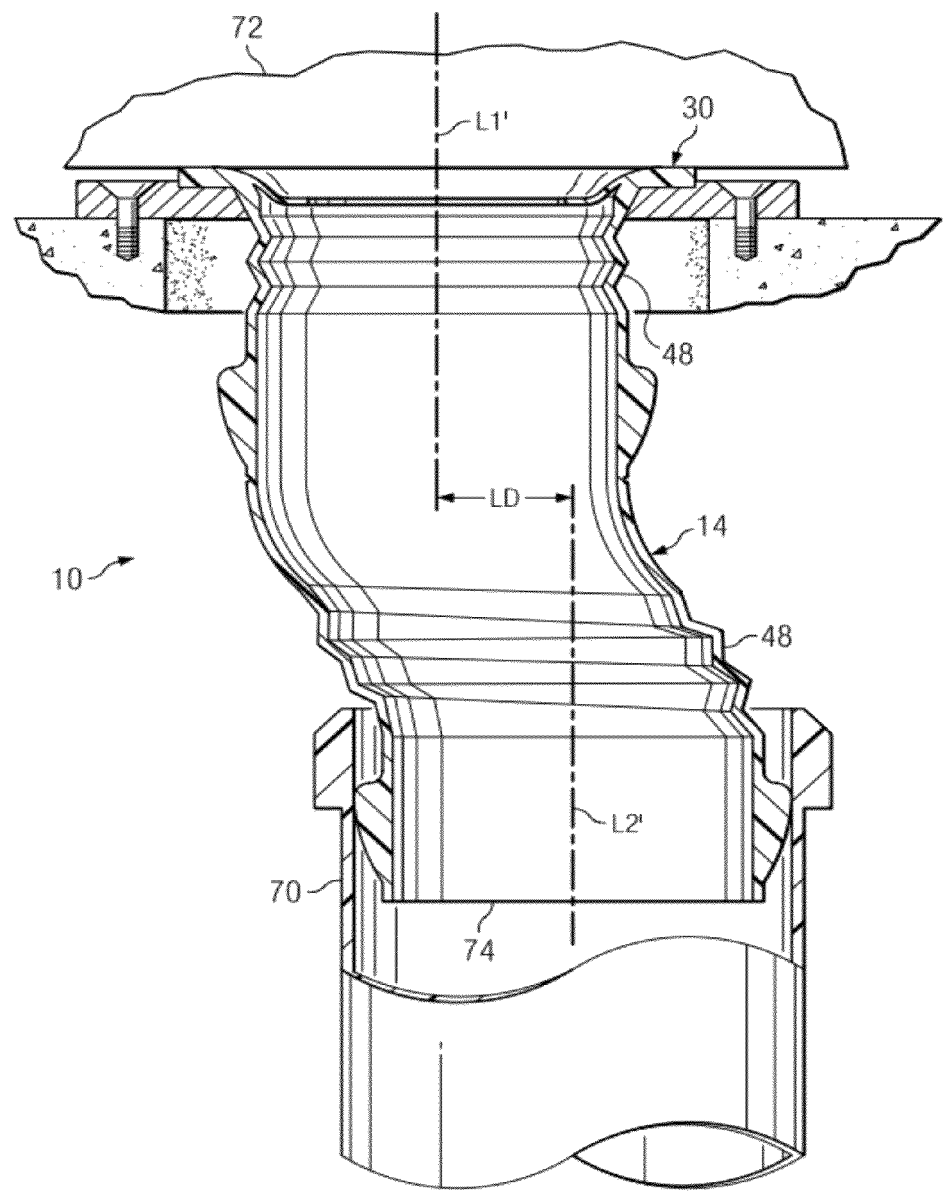
FIG. 5 illustrates an elevational sectional view of the flange apparatus installed in a horizontally offset waste drainpipe.

Referring to FIG. 5, the sleeve 18 is shown installed in a waste drainpipe 70 oriented in an offset manner relative to the upper portion 30 and a plumbing discharge 72. In particular, the plumbing discharge 72 and the upper portion 30 of the sleeve 18 lie on a common longitudinal axis L1', whereas the waste drainpipe 70 and a lower end 74 of the sleeve 18 lie on a common longitudinal axis L2'. The angular displacement between the longitudinal axes L1' and L2' is 0 degrees, yet the longitudinal axes are linearly displaced by a distance LD. The corrugated portion or portions 48 of the sleeve 18 facilitates distortion of the sleeve to achieve the desired linear displacement. Indeed, the installer may manually achieve the desired deflection (e.g., by bending the sleeve), thereby eliminating the need for additional equipment or materials for installation.

Figure 6:
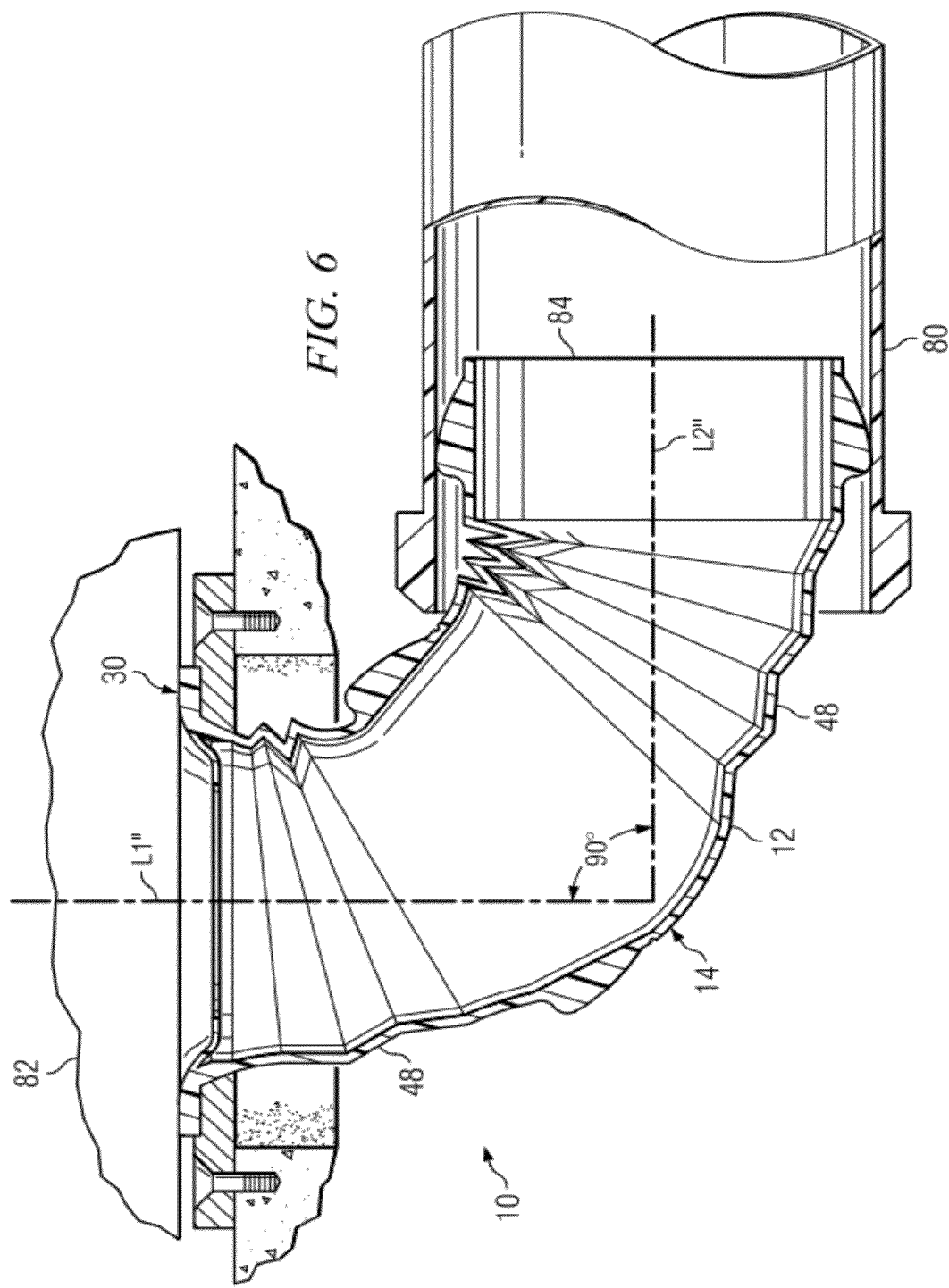
FIG. 6 illustrates an elevational sectional view of the flange apparatus installed in a horizontally oriented waste drainpipe.

Referring to FIG. 6, the sleeve 18 is shown installed in a waste drainpipe 80 oriented in a substantially orthogonal manner relative to the upper portion 30 and a plumbing discharge 82. In particular, the plumbing discharge 82 and the upper portion 30 of the sleeve 18 lie on a common longitudinal axis L1'', whereas the waste drainpipe 80 and a lower end 84 of the sleeve 14 lie on a common longitudinal axis L2''.

The angular displacement between the longitudinal axes L1" and L2" is 90 degrees. The corrugated portion or portions 48 of the sleeve 18 facilitates distortion of the sleeve to achieve the desired angular displacement. Indeed, the installer may manually achieve the desired deflection (e.g., by bending the sleeve), thereby eliminating the need for additional equipment or materials for installation.

Figure 7:
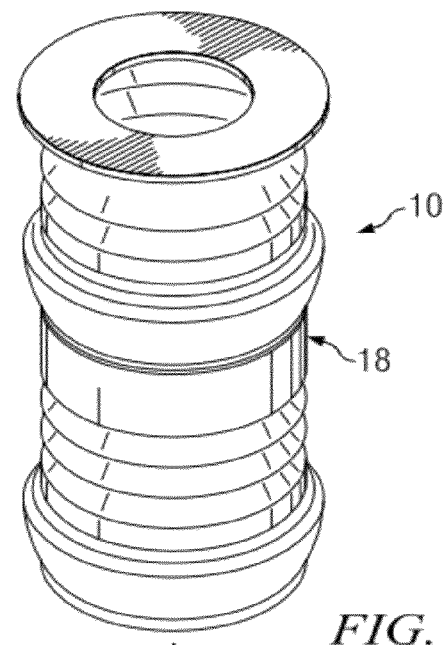
FIG. 7 illustrates an isometric view of the flange apparatus; for disposal within a waste drainpipe having a substantially circular cross section.

It is to be appreciated that the flexible flange apparatus 10 has additional benefits, such as the ability to deform to fit undersized pipes. Referring to FIG. 7, in one embodiment, the sleeve 18 has a substantially circular cross section when not subjected to external forces. Such a configuration is desirable to accommodate connection to a circular-shaped waste drainpipe 90. As can be appreciated, the sleeve 18 may accommodate connection to a variety of drainpipes of non-standardized schedules and to plastic or cast-iron drainpipes. Also, the sleeve 18 may accommodate connection to waste drainpipes having varying sizes. For example, the sleeve 18 can be implemented in waste drainpipes having 3 inch (7.5 cm) and 4 inch (10 cm) diameters because of the flexibility of the sleeve. Alternatively, the flexible sleeve 18 can be implemented into either 3 inch or 4 inch drainpipes when utilizing an appropriately-sized seal, such as the seal 44.

Figure 9:
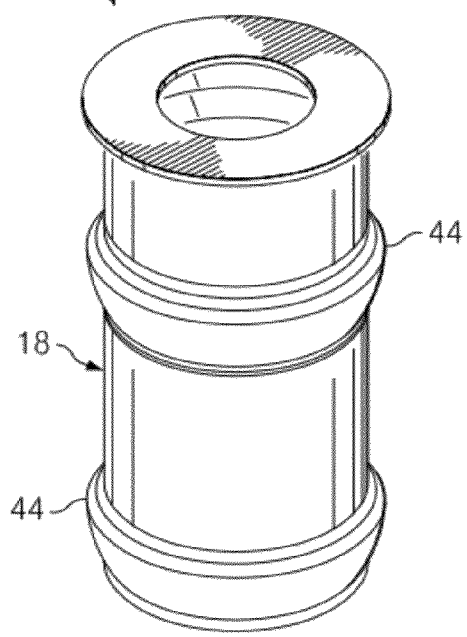
FIG. 9 illustrates an isometric view of yet another embodiment of a flexible flange apparatus according to the present disclosure.
Figure 8:
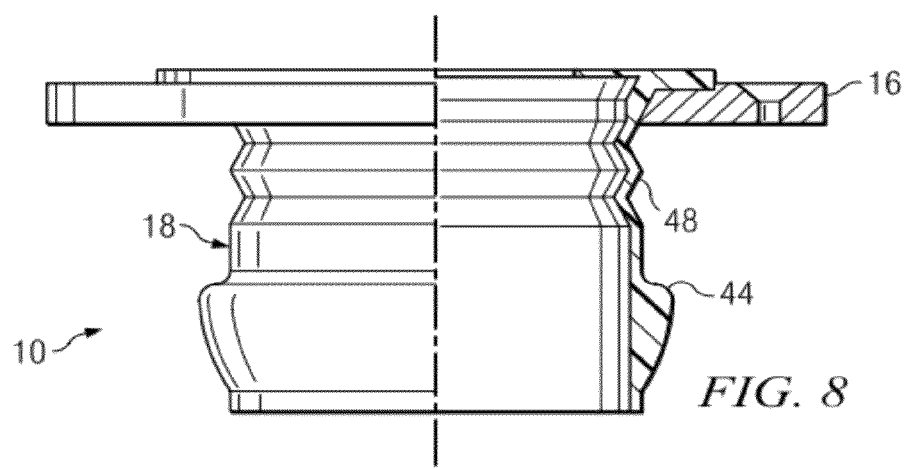
FIG. 8 illustrates a partial sectional, partial elevational view of another embodiment of a flexible flange apparatus according to the present disclosure.

While various embodiments of a flexible flange apparatus and related methods of installing the flexible flange apparatus between congruous and incongruous plumbing discharges and waste drainpipes have been described above, it should be understood that they have been presented by way of example only, and not limitation. For example, referring to FIG. 8, the flexible flange apparatus 10 may be modified to be shorter in length than the flexible flange apparatus illustrated in FIGS. 1-7. In one embodiment, the short embodiment of the flexible flange apparatus 10 may comprise an outer flange 16 and a sleeve 18 substantially similar to the outer flange and sleeve of FIGS. 1-8, except that the sleeve 18 comprises a single corrugated portion 48 and sealing element 44. Such configuration may be desirable when connecting between a plumbing discharge outlet and a waste drainpipe positioned substantially adjacent to one another. In some embodiments, the short version of the flexible flange apparatus 10 may be 2-5 inches in length. Still further, referring to FIG. 9, the sleeve 14 may have no corrugated portions, yet still have sufficient flexibility to deflect at a wide variety of angles relative to the non-distorted longitudinal axis L, including angles between 0 and 90 degrees.

Figure 10:
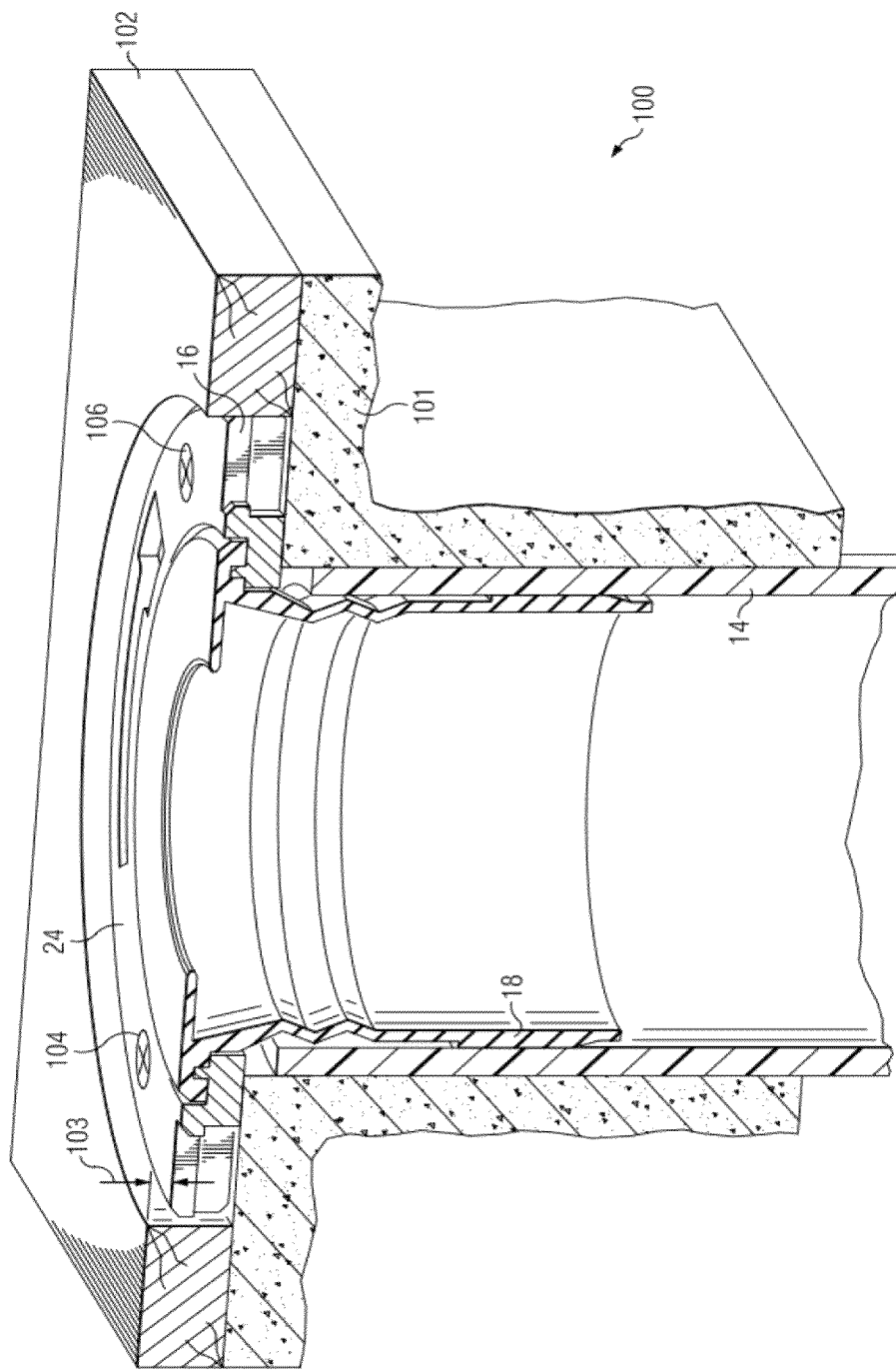
FIG. 10 illustrates a partial sectional, partial elevational view of an outer flange positioned directly on a ground slab.

Referring to FIG. 10, the flange apparatus 10 may be installed by connecting the outer flange 16 to a ground slab 101, which may be any type of structural floorings known in the art, such as a concrete slab or a wood decking. The connection may be secured by disposing a plurality of connectors 106 through a plurality of apertures 104 in the outer flange 16. In some embodiments, a finish flooring 102 may be thicker than the outer flange 16, and the upper surface 24 of the outer flange 16 may be positioned below the surface of the finish flooring 102 when the outer flange 16 is positioned directly on the ground slab 101. In the illustrated embodiment, the upper surface 24 is vertically offset from the surface of the finish flooring 102 by an offset distance 103. In one approach, a wax ring assembly (not shown) is disposed on the upper surface 24 to reduce the offset. The wax ring assembly may include an oversize wax ring, multiple standard wax rings stacked together, or a standard wax ring combined with an extension ring. However, preparing such a wax ring assembly is an inconvenient task for the installer, and more importantly, the addition of the wax ring parts to the installation introduces additional sources of leaks. As such, there is a need for an adjustable flange system that allows for convenient adjustment of the height of the surface 24 without introducing any additional source of leaks.

Figure 11:
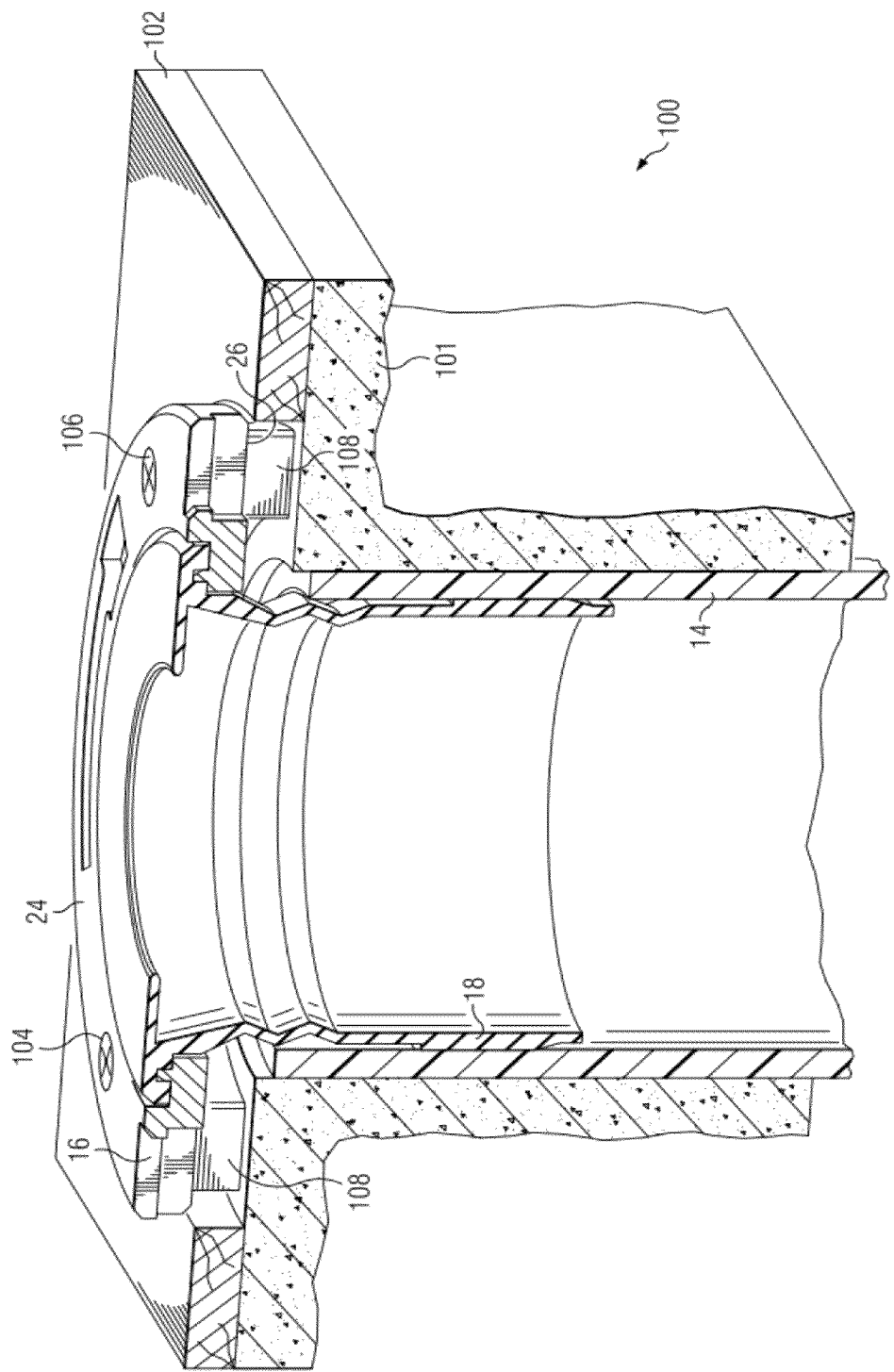
FIG. 11 illustrates a partial sectional, partial elevational view of an adjustable flange system in a first exemplary position according to the present disclosure.

Referring to FIG. 11, in one embodiment, there is shown a flange system 100 that allows the upper surface 24 of the outer flange 16 to be raised above the finish flooring surface 102, which is installed on top of the ground slab 101. In addition to the flange apparatus 10, the flange system 100 may further include at least one modular spacer 108 operable be coupled to the lower surface 26 of the outer flange 16 and raise the outer flange 16 so that the upper surface 24 of the outer flange 16 is above the finish flooring surface 102. By raising the outer flange 16, the ease of installation may be improved. The desired height of the plurality of modular spacers 108 in FIG. 11 may be substantially equal to the thickness of the finish flooring surface 102.

The modular spacer 108 may be seated directly on the ground slab 101 and disposed beneath the lower surface of the outer flange 16. The flange system 100 may include one or more modular spacer 108. In an embodiment, the modular spacer 108 may include at least one projection operable to be received in a recessed area defined in the outer flange 16. In another embodiment, the modular spacer 108 may not include an projection, but may be shaped to fit in an recessed area defined in the lower surface of the outer flange 16. In yet another embodiment, the lower surface of the outer flange 16 may simply rest on top of the modular spacer 108 without mechanical couplings. As discussed in later drawings, the modular spacers 108 may each be configured with one or more longitudinal apertures (not shown) that may align with the apertures 104 in the outer flange 16.

The flange apparatus 10 may be any flange apparatus disclosed in the present application, and due to its flexibility, it may be connected to any type of piping, such as piping made of cast iron, PVC, or ABS. It is to be appreciated that the use of the disclosed flange apparatus 10 together with the modular spacer of the present application allows for unexpected, synergistic results during the installation of the flange system 100. Government regulations often require water or air tests to ensure the absence of any leakage in the waste drainpipe. Conducting such tests, however, sometimes requires a flange apparatus to be installed over the waste drainpipe and sealed either by an integral sealing element or an external plug. The installation of a conventional flange apparatus may involve cementing or laminating one end of the conventional flange apparatus to the waste drainpipe. As such, when the finish flooring is laid down after the water or air test, the finish flooring is above the upper surface of the conventional flange apparatus because the vertical position of the conventional flange apparatus can no longer be adjusted. In this respect, flange apparatus 10 allows for initial installation without the use of adhesive or cement, and this in turn, allows the freedom to adjust the height of the flange apparatus 10 after the finish flooring is laid down after the water or air test. It is to be appreciated such height adjustments are effected without the use of wax rings, thereby eliminating additional sources of leaks and improving the ease of installation.

Figure 12:
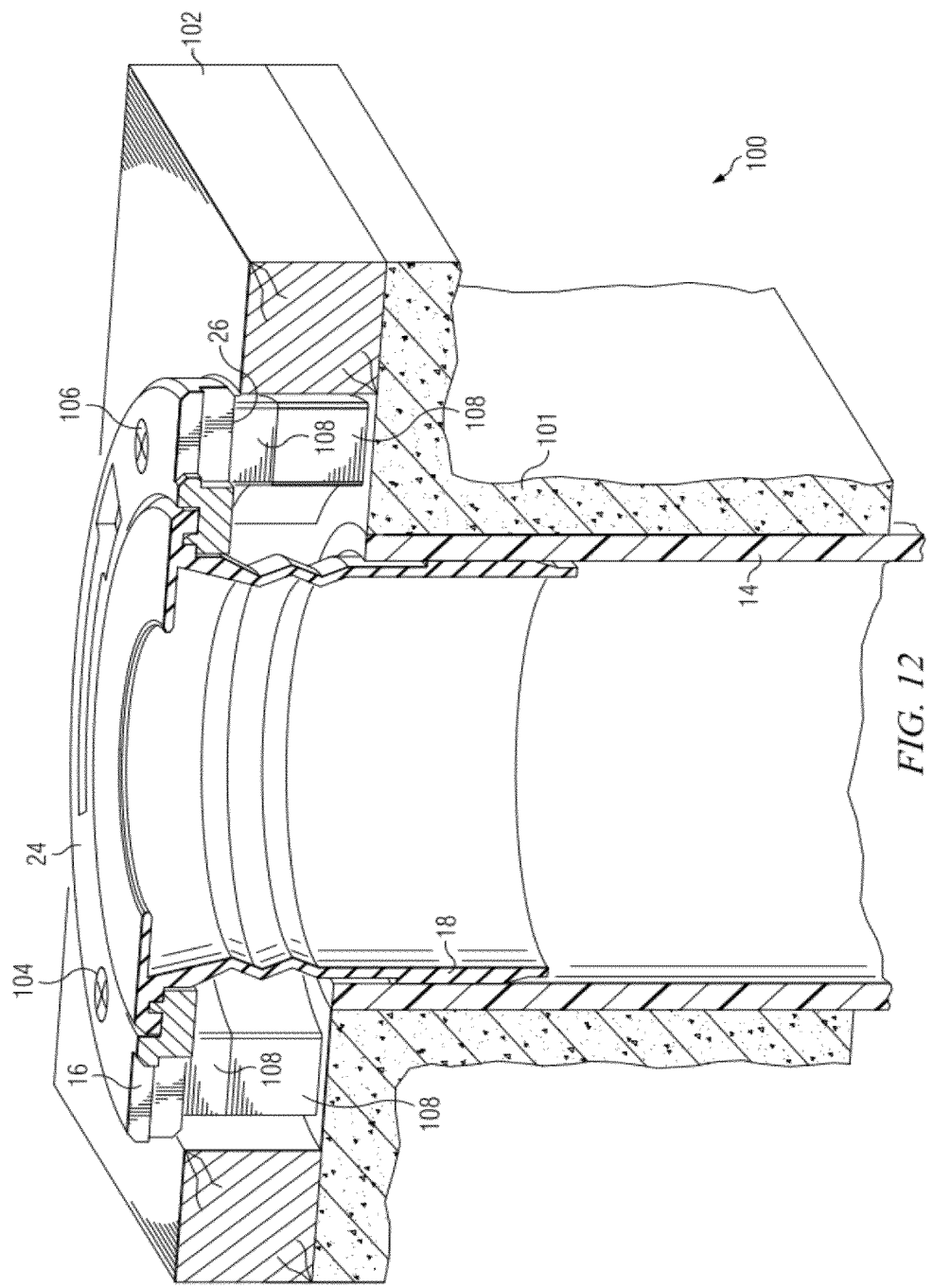
FIG. 12 illustrates a partial sectional, partial elevational view of the adjustable flange system of FIG. 11 in a second exemplary position according to the present disclosure.

Referring to FIG. 12, in an embodiment, the flange system 100 includes a plurality of modular spacers 108 that are stackable with each other. In FIG. 12, the flooring finish surface 102 is thicker than the flooring finish surface 102 in FIG. 11. Therefore, the outer flange 16 needs to be raised higher above the ground slab 101 in FIG. 12. The plurality of modular spacers 108 may be stackable with each other and in order to raise the outer flange 16 above the finish flooring surface 102 for receiving a discharge end of a plumbing fixture.

The desired height of the plurality of the stacked modular spacers 108 in FIG. 12 may be substantially equal to the thickness of the finish flooring surface 102. As shown in FIG. 12, if the thickness of the finish flooring surface 102 is greater than the height of a first modular spacer 108, the first modular spacer 108 may be placed directly on the ground slab 101 and then a second modular spacer 108 may be placed on top of the first modular spacer 108. The second modular spacer 108 may then interact with the lower surface 26 of the outer flange 18 and raise the upper surface 24 of the outer flange 16 above the finish flooring surface 102.

The height of the plurality of stacked modular spacers 108 in FIG. 12 is substantially equal to the thickness of the finish flooring surface 102 if a thicker finish flooring surface 102 is used than the finish flooring surface in FIG. 11. The plurality of modular spacers 108 are seated directly on top of the ground slab 101 and disposed beneath the lower surface of the outer flange 16. As discussed in later drawings, the plurality of stackable modular spacers 108 may each be configured with one or more longitudinal apertures (not shown) that align with the apertures in the modular spacer above or below and the apertures 104 in the outer flange 16.

Figure 13:
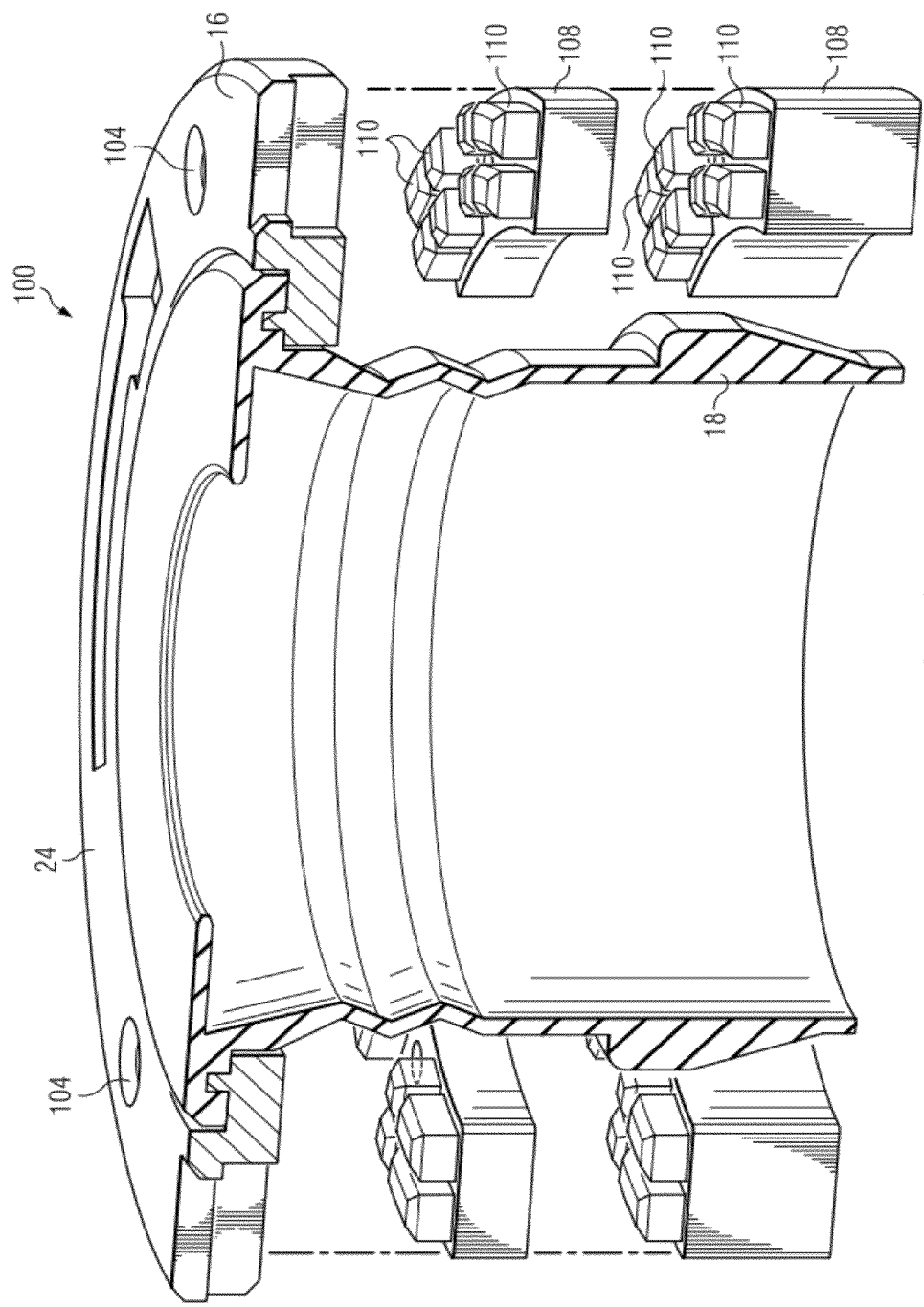
FIG. 13 illustrates a sectional exploded view of the adjustable flange system of FIG. 11 according to the present disclosure.

Referring to FIG. 13, in one embodiment, the plurality of modular spacers 108 may comprise a plurality of projections 110 on the upper surface of each modular spacer 108. The plurality of projections 110 may be configured to be received into one or more recessed areas (not shown) defined in the lower surface of the outer flange 16. The plurality of projections 110 may also be configured to be received into one or more recessed areas (not shown) defined in the lower surface of a stackable modular spacer 108. Although the illustrated embodiment of the modular spacer 108 includes a plurality of projections 110, it is to be appreciated that some embodiments of the modular spacer 108 may include only on projection 110.

The plurality of projections 110 on a first modular spacer 108 may be configured to be received into the recessed areas of the outer flange 16 or into the recessed areas of a second modular spacer 108 so that the apertures (not shown) in the first and second modular spacers 108 may align with the apertures 104 in the outer flange 16. This allows a connector 106 (shown later in FIG. 16) to be received through each of the apertures 104 and into the ground slab 101.

Figure 14:
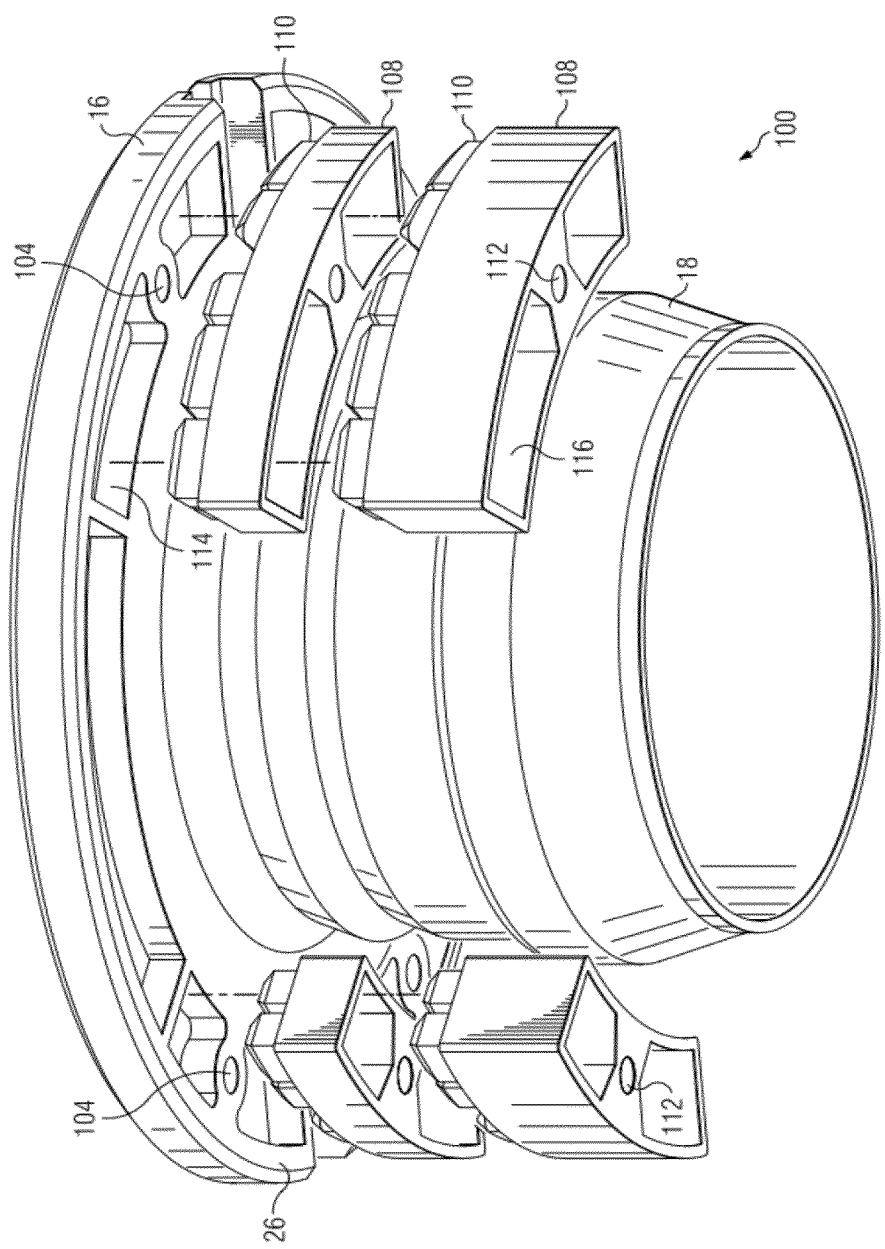
FIG. 14 illustrates a lower angle exploded view of the adjustable flange system of FIG. 11 according to the present disclosure.

Referring to FIG. 14, in one embodiment, the flange system 100 is shown in a lower angle exploded view. The outer flange 16 may be configured with a plurality of recessed areas 114 defined in its lower surface 26. The number of recessed areas 114 defined in the lower surface 26 of the outer flange 16 may be equal to or less than the number of projections 110 extending from each of the plurality of modular spacers 108, depending on whether each modular spacer 108 includes just one or a plurality of projections 110. Each modular spacer 108 may be configured with a plurality of recessed areas 116 define in a lower surface opposite the plurality of projections 110. The number of recessed areas 116 defined in each of the modular spacers 108 may be equal to or less than the number of projections 110.

Each of the uppermost modular spacers 108 may be operable to be connected to the lower surface 26 of the outer flange 16 by receiving the plurality of projections 110 extending from the modular spacers 108 into the recessed areas 114 defined in the lower surface 26 of the outer flange 16. Each recessed area 114 may be configured to receive one or more projections 110 extending from the modular spacer 108. Each of the lower modular spacers 108 may be operable to be connected to the modular spacer 108 directly above it by receiving the plurality of projections 110 extending from the lower modular spacer 108 into the recessed areas 116 defined in the upper modular spacer 108. Each recessed area 116 of the upper modular spacer 108 may be configured to receive one or more projections 110 extending from the lower modular spacer 108.

The combination of projections 110 and recessed areas 116 in each of the modular spacers 108 allows for the modular spacers 108 to be stackable in order to be able to raise the outer flange 16 above the finish flooring surface 102, regardless of the thickness of the finish flooring surface 102.

The outer flange 16 may be configured with a plurality of apertures 104 about its circumference through which to connect the outer flange 16 to the ground slab. The modular spacers 108 may be similarly configured with at least one longitudinal aperture 112 through which to connect the outer flange 16 to the ground slab. When the modular spacers 108 are received into the outer flange 16, the apertures 104 and 112 may align so that a connector 106 (not shown) may be received through apertures 104 in the outer flange 106 and through the apertures 112 in the stackable modular spacers 108 and connect the outer flange 16 to the ground slab 101 (not shown).

Figure 15:
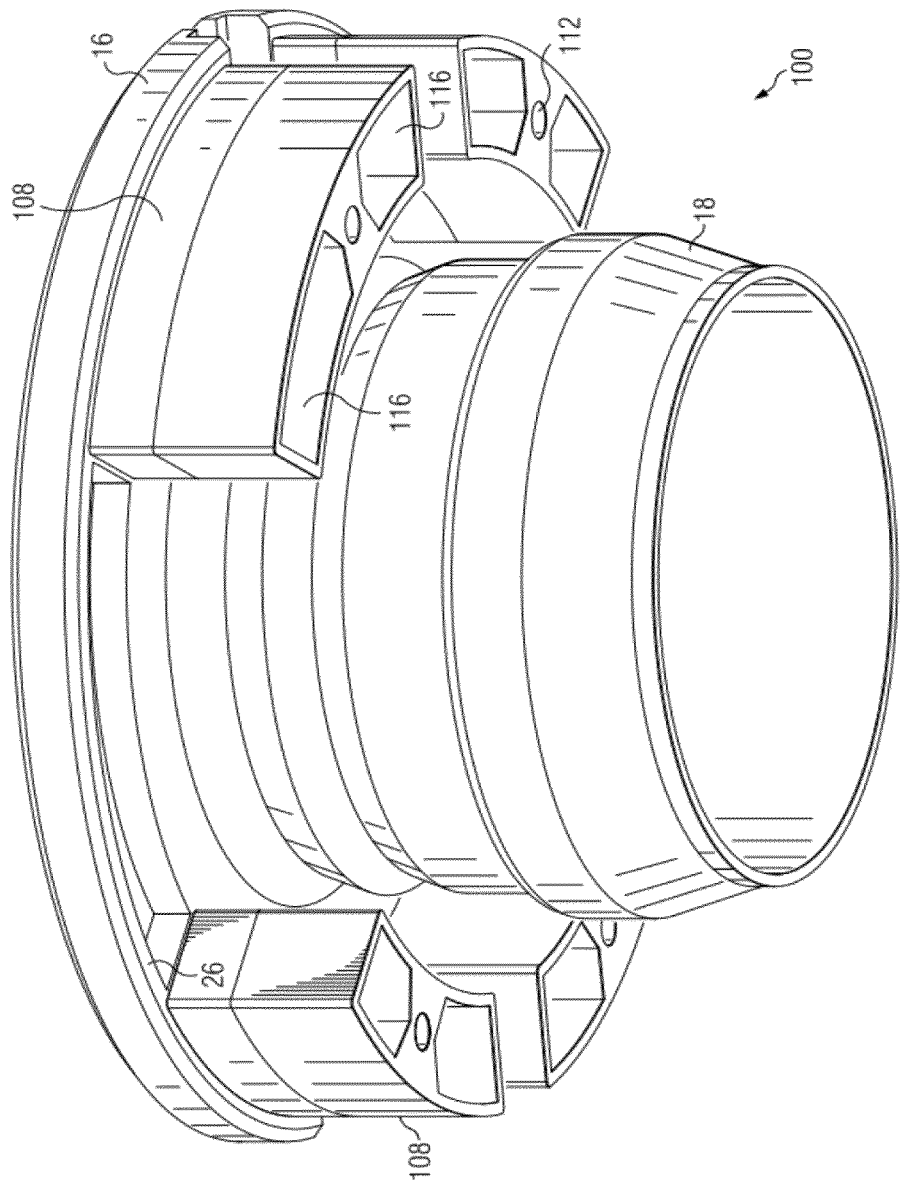
FIG. 15 illustrates a lower angle assembled view of the adjustable flange system of FIG. 11 according to the present disclosure.

Referring to FIG. 15, in one embodiment, a lower angle view of the flange system 100 is shown. FIG. 15 shows a plurality of stacked modular spacers 108, with the projections 110 extending from the upper modular spacers 108 received into the recessed areas 114 defined in lower surface 26 of the outer flange 16 and the projections 110 extending from the lower modular spacers 108 received into the recessed areas 116 defined in the upper modular spacers 108. As can be seen in FIG. 15, and discussed previously, the apertures 112 in the modular spacers 108 and the apertures 104 in the outer flange 16 may be aligned to receive a connector 106 (shown later in FIG. 16) therethrough.

Figure 16:
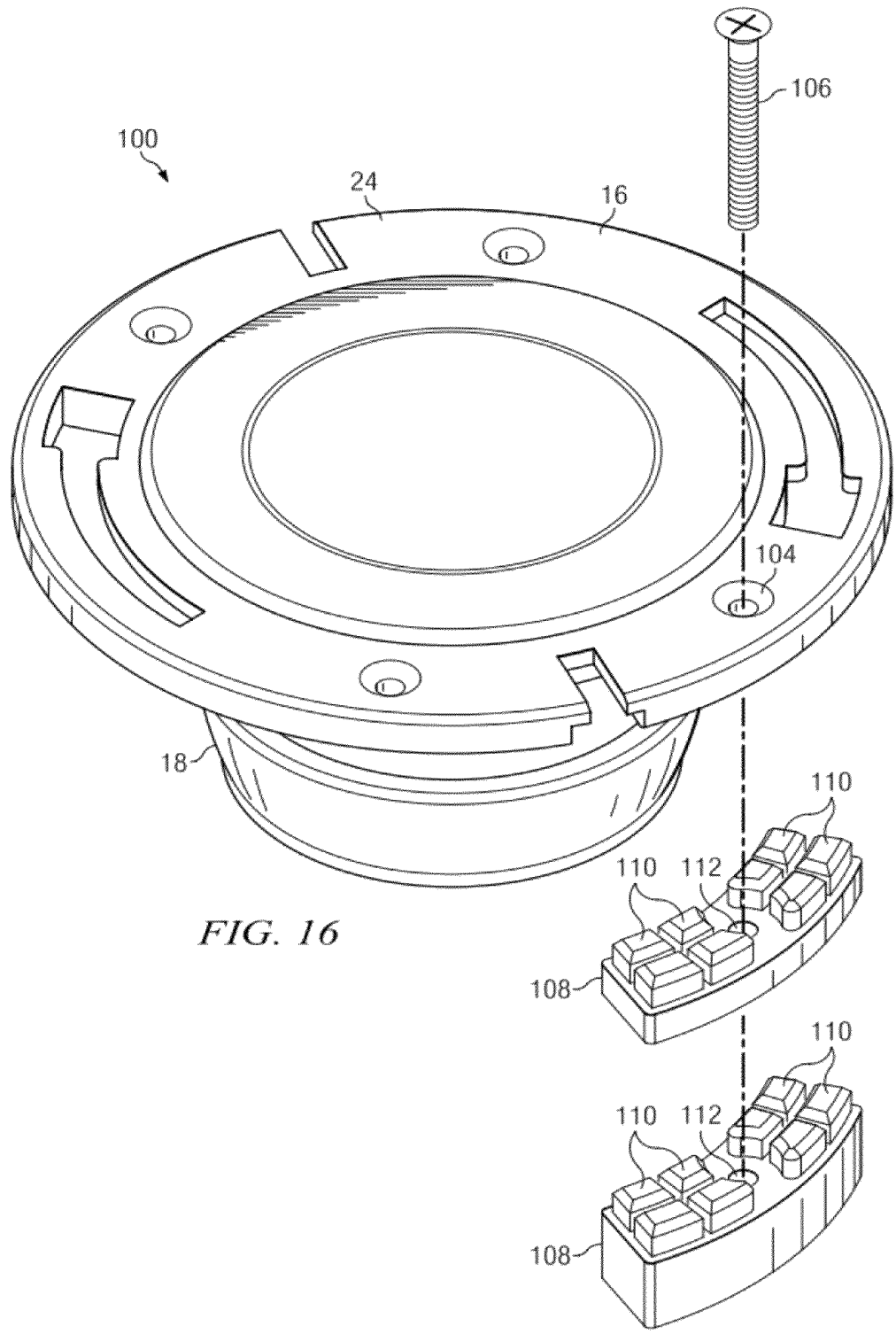
FIG. 16 illustrates an exploded view of another embodiment of an adjustable flange system according to the present disclosure.

Referring to FIG. 16, in one embodiment, an exploded view of the flange system 100 is shown. As can be seen in FIG. 16, and discussed above, the apertures 112 in the modular spacers 108 and the apertures 104 in the outer flange 16 may be aligned to receive a connector 106 therethrough. Each of the apertures 104 in the outer flange 16 is configured to receive a connector 106 therethrough, but prevent the head of the connector 106 from traveling through the outer flange 16. Each connector 106 may be configured to be received through the outer flange 16 and one or more modular spacers 108, when they are stacked with each other, and into the ground slab 101 (not shown). Advantageously, this may raise the outer flange 16 above the finish flooring surface 102 (not shown) and ease the difficulty required for installation of the outer flange 16 and flexible sleeve 18.

Figure 17A:
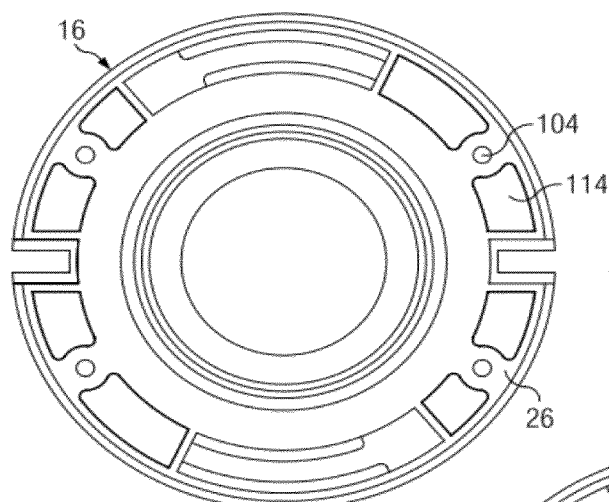
FIG. 17A illustrates a planar view of the recessed areas of a lower surface of the outer flange according to the present disclosure.
Figure 17B:
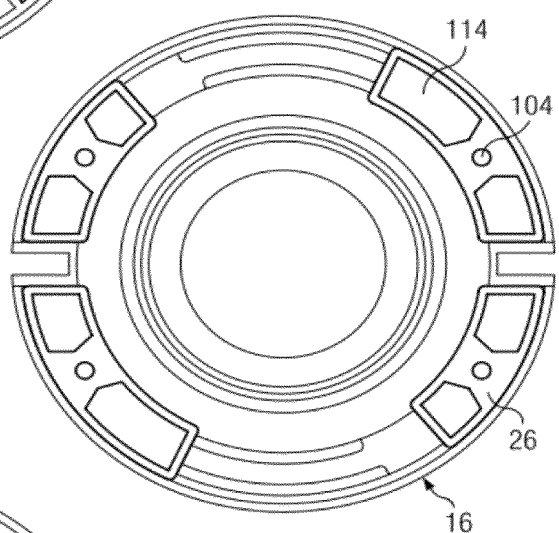
FIG. 17B illustrates a planar view of an alternative embodiment of the recessed areas of the lower surface of the outer flange according to the present disclosure.
Figure 17C:
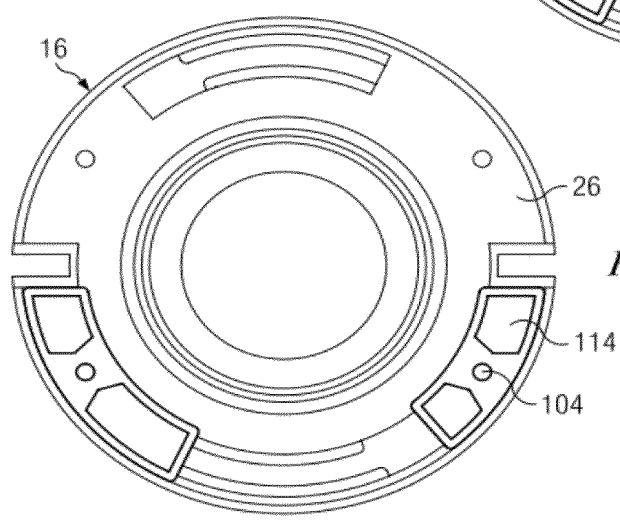
FIG. 17C illustrates a planar view of an alternative embodiment of the recessed areas of the lower surface of the outer flange according to the present disclosure.
Figure 18:
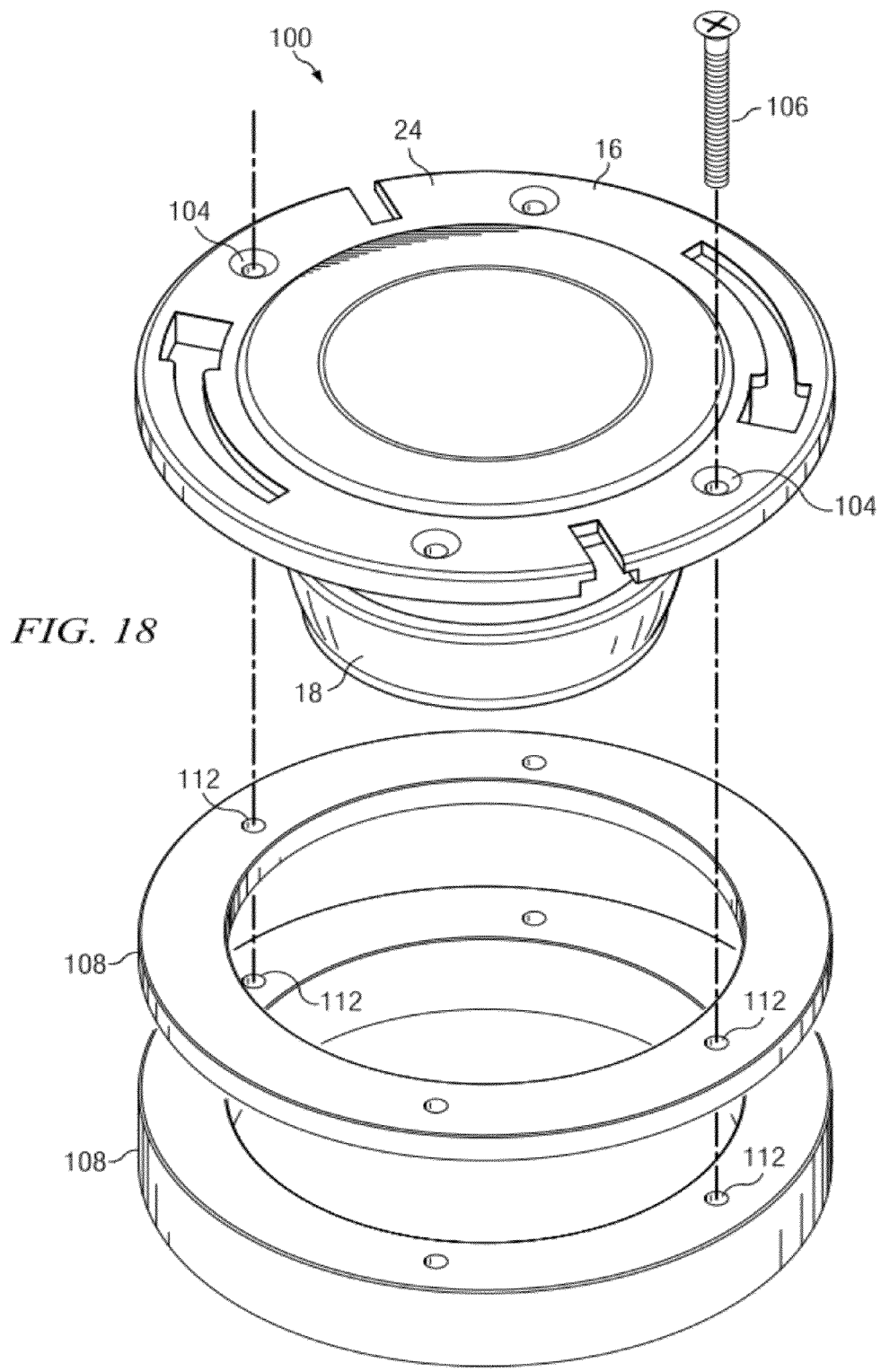
FIG. 18 illustrates an exploded view of yet another embodiment of an adjustable flange system according to the present disclosure.

Referring now to FIGS. 17A, 17B, and 17C, there are shown three separate embodiments of the outer flange 16. In each configuration, the plurality of recessed areas 114 defined in the lower surface 26 of the outer flange 16 can be seen, as well as the plurality of apertures 104 used by the connection means 106 referred to in FIG. 16. The lower surface 26 of the outer flange 16 may be configured with any number of recessed areas 114 and apertures 104 as is needed to the particular installation. The shape of each of the recessed areas 114 of the outer flange 16 may be determined by the shape of the projections 110 extending from each of the modular spacers 108, and each recessed area 114 may be configured to receive one or more projections 110. The number of apertures 104 may be determined by the number of apertures 112 in the modular spacers 108. Each stack of modular spacers may be configured to have one or more longitudinal apertures 112, each of which is configured to receive a connector 106. In an exemplary embodiment, a pair of the recessed areas 114 of the outer flange 16 may be diametrically opposing each other, and a pair of the plurality of modular spacers 108 may be operable to be received in the pair of diametrically opposing recessed areas 114 of the outer flange 16. In another exemplary embodiment, a trio of the recessed areas 114 of the outer flange 16 may be evenly spaced from each other about a circumference of the outer flange, and a trio of the plurality of modular spacers 108 may be operable to be received in the trio of recessed areas 114 of the outer flange 16. It is to be appreciated that the disclosed embodiments are provided to illustrate a few exemplary arrangements of the recessed areas 114 and the modular spacers 108 and do not limit the scope of the present disclosure. Turning now to FIG. 18, a flange system 100 may include a modular spacer 108 having a cylindrical body. The central opening of the cylindrical body allows the modular spacer 108 to be disposed around a top portion of the sleeve 18.

Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An adjustable device for providing a conduit between a plumbing fixture discharge and waste drainpipe outlet, the device comprising:
   a member having a recessed area defined in a lower surface of the member;
   a flexible sleeve operable to be connected to an upper surface of the member; and
   a modular spacer having a connecting portion operable to be received in the recessed area of the member, thereby coupling the modular spacer to the member.

2. The device according to claim 1, wherein the member comprises a plurality of recessed areas defined in the lower surface of the member, the plurality of recessed areas being circumferentially spaced from each other.

3. The device according to claim 2, wherein the device comprises a plurality of modular spacers, each modular spacer comprising a connecting portion operable to be received in one of recessed areas of the member, thereby coupling the modular spacer to the member.

4. The device according to claim 1, wherein the connecting portion of the modular spacer comprises a projection extending from an upper surface of the modular spacer.

5. The device according to claim 4, wherein the connecting portion of the modular spacer comprises a plurality of projections extending from the upper surface of the modular spacer, the plurality of projections being operable to be received in the recessed area of the member.

6. The device according to claim 1, wherein the modular spacer has a height and is operable to position the member such that the upper surface of the member is disposed above a finished floor surface located above a ground surface.

7. The device according to claim 1, wherein the modular spacer comprises a cylindrical body and is operable to be disposed around the sleeve.

8. The device according to claim 1, wherein
   the system comprises a plurality of modular spacers, each modular spacer comprising:
      an upper surface and a lower surface;
      a projection in the connecting portion, the projection extending from the upper surface of the respective modular spacer; and
      a recessed area defined in the lower surface of the respective modular spacer,
   the projection of a first of the modular spacers is operable to be received in the recessed area of the member, thereby coupling the first modular spacer to the member, and
   the projection of a second of the modular spacers is operable to be received in the recessed area of the first modular spacer, thereby coupling the second modular spacer to the first modular spacer.

9. The device according to claim 8, wherein
   the plurality of modular spacers each comprise a plurality of projections extending from the upper surface of the respective modular spacer and a plurality of recessed areas defined in the lower surface of the respective modular spacer, and
   the plurality of modular spacers each comprise the same number of recessed areas and projections.

10. The device according to claim 8, wherein
   the plurality of modular spacers each comprise a plurality of projections extending from the upper surface of the respective modular spacer and a plurality of recessed areas defined in the lower surface of the respective modular spacer, and
   the plurality of modular spacers each comprise different numbers of recessed areas and projections.

11. The device according to claim 8, wherein
   the member comprises an aperture defined therethrough, the aperture extending from the upper surface of the member to the lower surface of the member,
   the first and second modular spacers each further comprise an aperture extending from the upper surface of the respective modular spacer to the lower surface of the respective modular spacer, and
   the aperture of the first modular spacer, the aperture of the second modular spacer, and the aperture of the member are aligned along a longitudinal axis when the first modular spacer, the second modular spacer, and the member are coupled together.

12. The device according to claim 8, wherein
   the first and second modular spacers have a total height when coupled together, and the coupled first and second modular spacers are operable to position the member such that the upper surface of the member is disposed above a finished flooring surface located above a ground surface.

13. The device according to claim 1, wherein the sleeve is unitarily formed of a flexible material and has one or more corrugated portions along a lower portion of the sleeve.

14. The device according to claim 1, wherein the sleeve further comprises an inward lip extending from an outer, top surface of an upper portion of the sleeve, the lip being sufficiently flexible to deflect downward when engaged by the plumbing fixture discharge.

15. The device according to claim 1, wherein the sleeve further comprises one or more sealing elements disposed about a lower portion of the sleeve, the sealing element comprising a maximum outside diameter of the lower portion and being sized to directly engage an inside diameter of the waste drainpipe outlet.

16. The device according to claim 1, wherein the sleeve is integrally formed with the member.

17. The device according to claim 1, wherein the sleeve is removably connected to the member.

18. The device according to claim 1, wherein the member comprises an aperture defined therethrough, the aperture extending from the upper surface of the member to the lower surface of the member.

19. The device according to claim 18, wherein
the modular spacer comprises an aperture defined therethrough, the aperture extending from an upper surface of the modular spacer to a lower surface of the modular spacer, and
the aperture of the modular spacer and the aperture of the member are aligned along a longitudinal axis when the modular spacer is coupled to the member.

20. An adjustable device for providing a conduit between a plumbing fixture discharge and waste drainpipe outlet, the device comprising:
a member having a plurality of recessed areas defined in a lower surface of the member;
a flexible sleeve operable to be connected to an upper surface of the member; and
a plurality of modular spacers, each having an upper surface and a projection extending therefrom, the projection being operable to be received in one of the recessed areas of the member, thereby coupling each modular spacer to the member.

21. The device of claim 20, wherein the plurality of modular spacers have a same height and are operable to cooperate to position the member such that the upper surface of the member is at least flush with a finished floor surface located above a ground surface.

22. The device of claim 20, wherein
a pair of the recessed areas of the member are diametrically opposing each other, and
a pair of the plurality of modular spacers are operable to be received in the pair of diametrically opposing recessed areas of the member respectively.

23. The device of claim 20, wherein
a trio of the recessed areas of the member are evenly spaced from each other about a circumference of the member, and
a trio of the plurality of modular spacers are operable to be received in the trio of recessed areas of the member respectively.

24. A method of manufacturing a device, comprising:
forming a member having a recessed area defined in a lower surface of the member;
forming a flexible sleeve operable to be connected to an upper surface of the member; and
forming at least one modular spacer having a projection extending from an upper surface of the modular spacer, the projection being operable to be received in the recessed area of the member, thereby coupling the modular spacer to the member.

25. The method of claim 24, further comprising seating the flexible sleeve on the upper surface of the member.

26. The method of claim 24, further comprising coupling the at least one modular spacer to the member.

27. The method of claim 24, wherein
the forming the member comprises forming the member having a plurality of recessed areas defined in the lower surface of the member, and
the forming the at least one modular spacer comprises forming a plurality of modular spacers in one batch, each modular spacer having an upper surface and a projection extending therefrom, the projection being operable to be received in one of the recessed areas of the member, thereby coupling the modular spacer to the member.

28. The method of claim 24, wherein
the forming the member comprises forming an aperture extending from the upper surface of the member to the lower surface of the member,
the forming the at least one modular spacer comprises forming an aperture extending from the upper surface of the modular spacer to a lower surface of the modular spacer, and
the aperture of the modular spacer and the aperture of the member are aligned along a longitudinal axis when the modular spacer is coupled to the member.

29. The method of claim 24, wherein the forming the at least one modular spacer comprises forming a plurality of projections extending from the upper surface of the modular spacer, the plurality of projections being operable to be received in the recessed area of the member.

* * * * *